July 14, 1936.  R. T. HAZELTON  2,047,322
SHEARS FOR SHEET METAL
Filed May 26, 1933  2 Sheets-Sheet 2

INVENTOR,
Robert T. Hazelton
BY Allen & Allen
ATTORNEYS.

Patented July 14, 1936

2,047,322

UNITED STATES PATENT OFFICE 2,047,322

SHEARS FOR SHEET METAL

Robert T. Hazelton, Cincinnati, Ohio, assignor to The Cincinnati Shaper Company, Cincinnati, Ohio, a corporation of Ohio Application May 26, 1933, Serial No. 673,070

11 Claims. (Cl. 164—47)

My invention relates to power shears for sheet metal, or the like, and has for its general object the provision of a mechanism which will make a truer shearing cut, and in particular a perpendicular cut. It is also my object to produce a shear in which the back thrust on the metal piece is very much lessened, and in which provision is made for a better engagement of the knives and the work pieces. Still another object of my invention is the provision of a shear especially adapted to the use of four-edged knives. Still another object is the provision of a shear in which the above objects are satisfied, while adequate provision is made for clearance. Still another object of my invention is the provision of a shear in which a back gauge moving with a movable knife is made to release the piece as the knife descends, to prevent binding.

I shall describe my invention in connection with power shears of a type in which the lower knife is the fixed knife, and the upper knife the movable knife; but it will be understood that my invention is applicable to other types of shears than the exemplary embodiment herein chosen for the purpose of a disclosure.

The objects of my invention set forth hereinabove and other objects which will later be referred to, or which will be clear to one skilled in the art upon reading these specifications, I accomplish by that certain construction and arrangement of parts of which I shall now describe the aforesaid exemplary embodiment, reference being made to the drawings which form a part hereof, and in which Figure 1 is a side view with parts in section, of an exemplary type of power shears embodying my invention.

Figure 2:
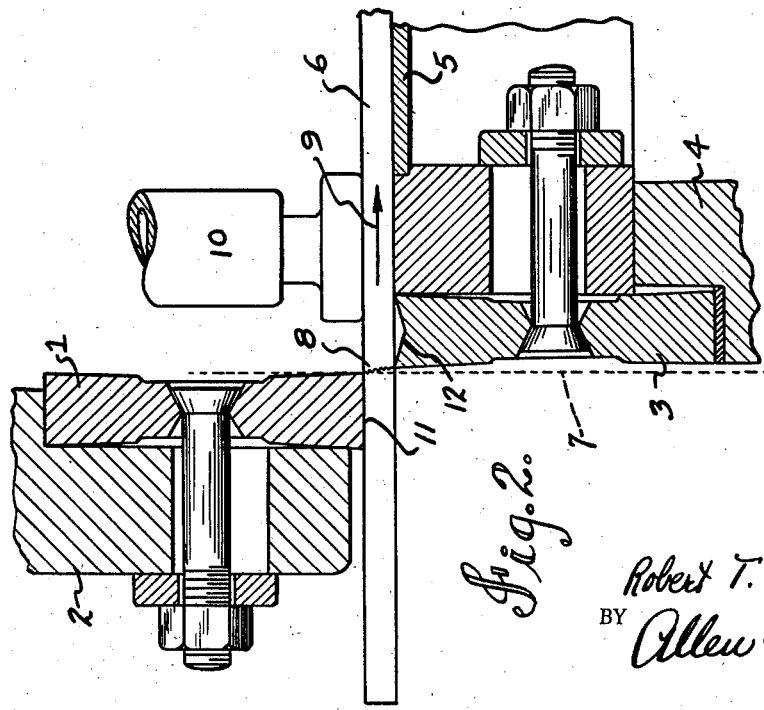
Fig. 2 is a sectional view of the upper and lower knives as ordinarily arranged in power shears.

Hitherto in power shears it has been the practice to provide a table, a fixed knife and a movable knife. The movable knife is carried by a ram which moves in a plane perpendicular to the plane of the table top, and which likewise moves perpendicularly to the plane of the stock being sheared. Such an arrangement is shown in Fig. 2, where a movable knife 1 is shown affixed to a ram 2, movable vertically. A lower knife 3 is shown fixed to the bed 4 of the shears, the top of this knife being substantially flush with the top of the shear table 5, while the piece of stock 6 is being sheared between the blades 1 and 3. Proper clearance for the blades must be provided, for which reason the forward edge of the blade 1 is offset from the rear edge of the blade 3 by an amount sufficient for a clearance as indicated by the dotted line 7. Due to this offset, the line of shearing stress on the piece 6 is represented at 8, and it will be noticed that this line is not vertical, but is slanting. Thus the line of cut formed in the piece 6 will exhibit a reverse bevel along the general line 8, and the cut will not be truly perpendicular. Furthermore, because of the slanting line of shearing stress on the piece 6, as shown at 8, there is, during the shearing operation a considerable force urging the piece 6 in the direction of the arrow 9. Unless the piece, therefore, is very positively held with reference to the table 5, the width of the sheared piece will not be the width desired, and the sheared piece is likely to be non-uniform in width. For this reason it has heretofore been found necessary to provide means for clamping the piece tightly with reference to the table, and I have indicated at 10 one means employed for this purpose, and comprising a series of hydraulic hold downs located in the line across the piece in front of the ram 2.

It is convenient, in power shears, to use four-edged knives, but it will be seen in Fig. 2 that if these knives are disposed vertically, then the faces thereof lie flat against the piece as shown at 11, and no true edge of the knife is presented to the piece unless the knife be hollow ground, as indicated at 12. The hollow grinding of these knives is relatively difficult and expensive, and has not been practiced, so far as I am aware.

Figure 3:
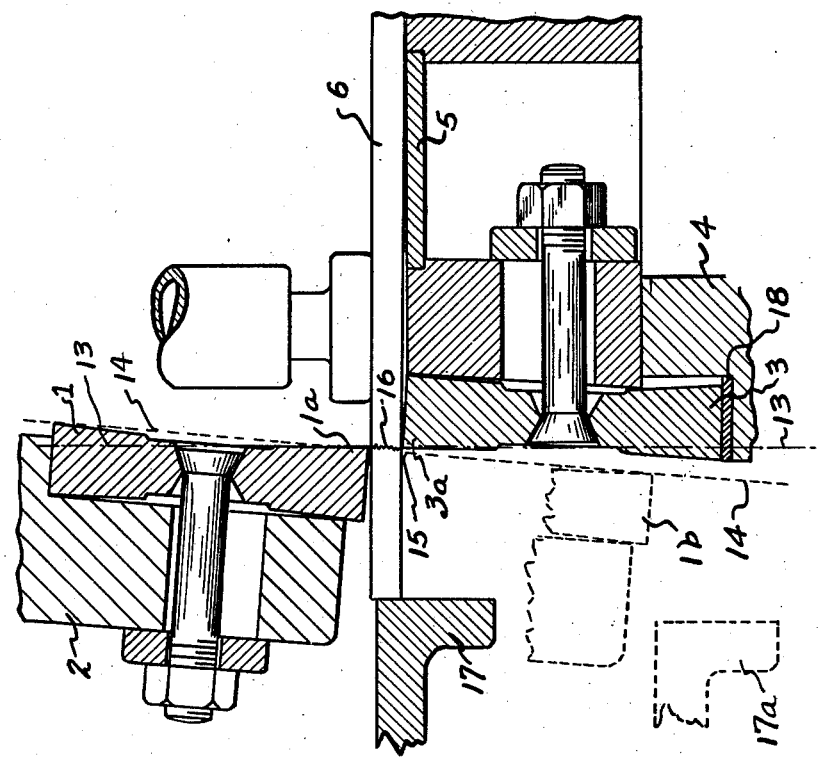
Fig. 3 is a sectional view of a power shear, with the knives arranged in accordance with my invention.

As distinguished from the structure just described, my invention contemplates the mounting of the movable knife upon a ram adapted to move, not perpendicularly to the plane of the piece, but at a slightly acute angle thereto when observed from the front of the shears. In Fig. 3 I have indicated a shear in which like parts are given like indicia. It will be seen, however, in this figure that the ram 2 is tilted forwardly a slight amount, as a consequence of which the knife 1 is similarly tilted. I have indicated by a dot and dash line 13 a perpendicular to the plane of the piece 6, and I have indicated by a dotted line 14 the plane of the path of travel of the knife 1. It will be seen that this plane is tilted forwardly a few degrees. It will also be seen that in this embodiment the lower edge 1a of the knife 1 lies very nearly perpendicularly above the upper edge 3a of the lower knife. Such a structure would be impossible in the ordinary shear because it makes no provision for clearance; but in the shear of my invention, clearance is provided by the angular path of travel of the upper knife, so that the lower edge of the upper knife will clear the upper edge of the lower knife, as indicated at 15. It is not a necessary limitation upon my invention that the lower edge of the upper knife be arranged exactly perpendicularly above the upper edge of the lower knife when it contacts the piece, but there will be obviously some point at which the lines 13 and 14 cross, and with pieces of uniform thickness, it is possible to arrange the knives in the way shown. When this condition is reached or reasonably approximated, it will be understood that the line of shearing stress in the piece 6 indicated at 16, is a vertical line, and as a consequence of this the cut in the piece will be true and perpendicular, and will not be characterized by a bevel.

It will be understood also that the lower knife 5a will be adjustable horizontally in Figure 3, either separately, or by movement of the table, and such adjustment also assist in producing the desired condition.

Further, since the upper knife is tilted as shown in Fig. 3, it presents its leading lower corner to the piece 6 instead of the flat face of its lower edge as shown at 11 in Fig. 2. This gives a very much better action with the four-edged knife. The knife may be made most economically by having its edge faces plane and parallel, and it may be ground and sharpened with economy and speed. The same condition can be attained in the lower knife by slightly tilting it with relation to the plane of the table 5 as shown in Fig. 3, the tilting of the lower knife, however, being at a lesser angle than the tilting of the upper knife, to continue the provision for clearance. By reason of the angularity of the path of travel of the knife 1 the forces acting on the sheet 6 tend in large measure to hold the sheet back and to eliminate the forward thrust indicated by the arrow 9 in Fig. 2. Consequently much more accurate shearing may be done, even with the use of very much lighter hold down devices.

My invention is not limited to any particular angularity of the movement of the ram, or any particular angularity of tilting of the lower knife. I have secured excellent results, by way of example, with a tilting of the ram of from 1 to 6 degrees to the vertical. Ordinarily I mount my ram and therefore tilt the upper knife at an angle, say, of about 3 degrees to the vertical, and tilt the lower knife at an angle of about 1 degree to the vertical, thereby relying on about 2 degrees of angular difference for the desired clearance.

Certain other advantages are inherent in this structure. Ordinarily in shears having a movable upper knife and a fixed lower knife mounted adjacent the table, a back gauge is mounted upon or attached to the ram. I have indicated such a gauge in Fig. 3 at 17. As the ram 2 moves downwardly, the gauge moves with it, until when the knife assumes the position shown in dotted lines at 1b, the gauge assumes a position shown in dotted lines at 17a. By reason of the angular movement of the knife 1, the gauge is carried backwardly, and thereby releases the piece instead of binding it against the knife 3. This occurs even though the knife 3 be tilted, because the tilting of this knife is less than the angularity of the path of travel of the movable knife. As the knives wear and are ground down they may, of course, be backed up by suitable shims as shown at 18 in Fig. 3.

Figure 1:
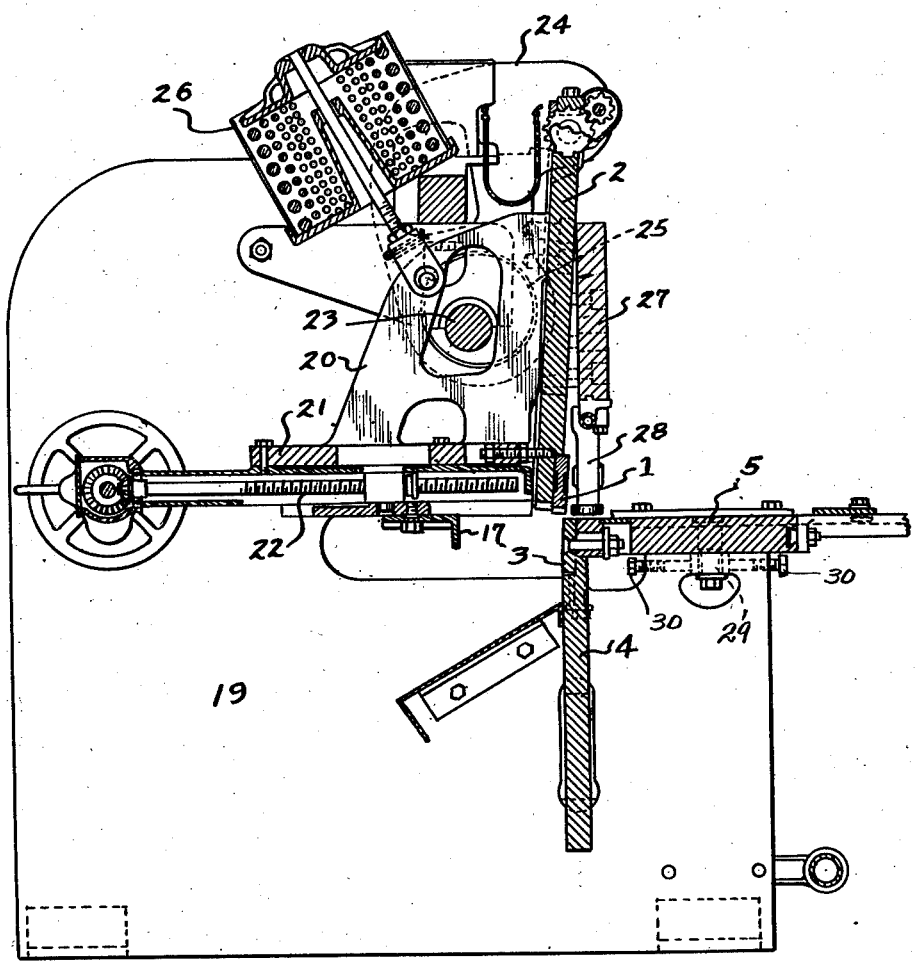

In order to make this general organization of parts clear, I have indicated a complete shear in Fig. 1. The frame of the machine is indicated at 19. It supports the table 5, together with the lower knife 3 and the backing member 4 for the lower knife. The ram 2 is made to slide upon machined guide ways on the frame members 19, these guide ways being machined at the desired angle to the vertical. Brackets 20 are attached to the ram, and bear a strengthening plate 21, to which the back gauge mechanism, having the abutment 17, is attached. The back gauge will, of course, be adjustable for different widths of cut, and has been indicated generally in Fig. 1 at 22. Power is supplied to the device through the main shaft 23, which operates pitmen 24 by means of a suitable eccentric 25. A compression spring device indicated generally at 26 engages the frame 19, and is also attached to the bracket 20. This serves to counter-balance to the ram and associated mechanism, and also serves to hold the ram back against the machined surfaces of the frame members 19. A bridge 27 is attached to projecting portions of the frame members and bears hold down mechanisms 28. The angularity of the ram and of the knife 1 is fairly apparent in Fig. 1, and the operation of the device will be clear therefrom.

As shown in Fig. 1, the forwardly extending table of the shear is made movable so as to permit relative adjustment of the knives for different thicknesses of material so that the knives can be caused to engage opposite sides of the material in substantially a perpendicular plane. To this end, the table is made slidable on the frame 19, and each end of the table is provided with a stud 29, held by set screws 30, or equivalent means engaging the frame.

Having thus described my invention, what I claim as new and desire to secure by Letters Patent, is:—

1. In a shearing mechanism, the combination of a movable blade and a fixed blade, means for immovably supporting a piece to be sheared, and means for moving said movable knife from a point substantially perpendicular above in a plane other than perpendicular to the plane in which said piece is supported by said supporting means, to produce a substantially perpendicular plane of cut.

2. In a shear, a fixed knife, a movable knife and a table, and means for moving said movable knife in a path other than perpendicular to said table, said means being so adjusted that when said knives engage said piece on opposite sides, the coacting edges of said knives are disposed in a line substantially perpendicular to said piece.

3. In a shear having a table, a fixed knife and a movable knife, said knives having coacting edges, means for causing said knives initially to act upon a piece immovably held in such a way that said edges are disposed to coincide with a line substantially perpendicular to said piece, and means for moving said movable knife during a shear stroke in such a way as to permit clearance between said knives when said knives pass each other.

4. In a shearing mechanism, the combination of a table, a fixed knife and a movable knife, said fixed knife being tilted with respect to said table, said movable knife being also tilted with respect to said table, but at a greater angularity, and means for producing relative movement of said knives so as to give clearance when they pass each other.

5. In a shearing device, the combination of a table, a fixed knife and a movable knife, means for tilting both of said knives, and means for producing a movement of said movable knife at an angle to a plane perpendicular to said table and in a plane other than parallel to the surface of said fixed knife, said means being so adjusted as to produce in a piece being sheared a line of shearing stress substantially perpendicular to said piece.

6. In a shearing mechanism, frame members, a table, a fixed knife and ram slidably mounted in ways on said frame members, a knife attached to said ram, said ways being tilted with respect to said table forwardly of a direction perpendicular thereto, and so adjusted that, when said knives contact a piece of given thickness immovably held on said table to be sheared, the coacting edges of said knives will be located substantially in a line perpendicular to said piece.

7. In a shearing mechanism, frame members, a table, a hold-down device, a fixed knife and a ram slidably mounted in ways on said frame members, a knife and a back gauge attached to said ram, said ways being tilted with respect to said table forwardly of a direction perpendicular thereto, and so adjusted that when said knives contact a piece of given thickness immovably held on said table to be sheared, the coacting edges of said knives will be located substantially in a line perpendicular to said piece, and so that the plane of the movement of the ram and the attached knife will cross the edge of the lower knife and the gauge will move away from said lower knife as the ram moves in its ways.

8. In a shear for producing a substantially perpendicular plane of cut, a table, a fixed knife and a movable knife, means for tilting at least one of said knives with respect to said table, and means for moving said movable knife in a plane other than perpendicular to said table, said means being so arranged as to cause said knives to contact opposed surfaces of a piece to be sheared at lines or points lying in a plane substantially perpendicular to said table, and to provide clearance between said knives during movement of said movable knife past said fixed knife.

9. In a shearing mechanism for producing perpendicular cuts, a table fixing the plane of a piece to be sheared, a fixed knife and a movable knife, means for tilting both knives with respect to said plane, means for producing relative movement of said knives in a direction other than perpendicular to said plane, and so as to give clearance to said knives when they pass each other, said means being adjustable to cause the edges of said knives to be presented to a piece to be sheared at the opposite sides thereof in a plane substantially perpendicular to said table.

10. In a shear, a fixed knife, a movable knife and a table, means for moving said movable knife in a path other than perpendicular to said table, and means for adjusting the positions of said knives with respect to said path of movement, for different thicknesses of pieces to be sheared, so that when said knives engage a piece on opposite sides, the co-acting edges of said knives are disposed in a line substantially perpendicular to said piece, said fixed knife being fastened to said table, said table being movable, said adjustment means comprising means for moving and holding said table in adjusted position.

11. In a shear, a fixed knife, a movable knife and a table, means for moving said movable knife in a path other than perpendicular to said table, and means for adjusting the positions of said knives with respect to said path of movement, for different thicknesses of pieces to be sheared, so that when said knives engage a piece on opposite sides, the co-acting edges of said knives are disposed in a line substantially perpendicular to said piece, said means for moving said movable knife during a shear stroke being disposed so as to permit clearance between said knives when said knives pass each other.

ROBERT T. HAZELTON.